United States Patent [19]

Wagensonner et al.

[11] Patent Number: 4,812,903
[45] Date of Patent: Mar. 14, 1989

[54] METHOD OF ELECTRONICALLY IMPROVING THE SHARPNESS AND CONTRAST OF A COLORED IMAGE FOR COPYING

[75] Inventors: Eduard Wagensonner, Aschheim; Wolfgang Ruf, Munich; Hermann Fuchsberger, Ismaning; Klaus Birgmeir, Putzbrunn, all of Fed. Rep. of Germany

[73] Assignee: AGFA-Gevaert Aktiengesellschaft, Leverkusen, Fed. Rep. of Germany

[21] Appl. No.: 85,942

[22] Filed: Aug. 14, 1987

[30] Foreign Application Priority Data

Aug. 29, 1986 [DE] Fed. Rep. of Germany ....... 3629396

[51] Int. Cl.[4] .......................... G03F 3/08; H04N 1/46; H04N 9/64
[52] U.S. Cl. .......................................... 358/80; 358/40; 358/75
[58] Field of Search .................. 358/75, 80, 27, 28, 358/29, 29 C, 36, 37, 39, 40, 76, 78

[56] References Cited

U.S. PATENT DOCUMENTS

| | | | |
|---|---|---|---|
| 3,715,477 | 2/1973 | Olson et al. | 358/36 |
| 3,835,243 | 9/1974 | Nagaoka | 358/36 |
| 4,009,334 | 2/1977 | Sypula | 358/36 |
| 4,058,828 | 11/1977 | Ladd | 358/80 |
| 4,245,237 | 1/1981 | Lagoni | 358/36 |
| 4,365,266 | 12/1982 | Lagoni | 358/36 |
| 4,499,486 | 2/1985 | Favreau et al. | 358/37 |
| 4,661,843 | 4/1987 | Sekizawa et al. | 358/80 |
| 4,689,666 | 8/1987 | Hatanaka | 358/36 |
| 4,706,111 | 11/1987 | Abe et al. | 358/36 |
| 4,712,132 | 12/1987 | Soca | 358/37 |
| 4,734,763 | 3/1988 | Urabe et al. | 358/80 |

FOREIGN PATENT DOCUMENTS

| | | |
|---|---|---|
| 0070680 | 1/1983 | European Pat. Off. . |
| 0131430 | 1/1985 | European Pat. Off. . |
| 0168818 | 1/1986 | European Pat. Off. . |
| 60-83488 | 5/1985 | Japan ................. 358/29 C |
| 60-254985 | 12/1985 | Japan ................. 358/27 |
| 60-256292 | 12/1985 | Japan ................. 358/27 |
| 86/03087 | 5/1986 | PCT Int'l Appl. ............ 358/27 |

Primary Examiner—James J. Groody
Assistant Examiner—Randall S. Svihla
Attorney, Agent, or Firm—Peter K. Kontler

[57] ABSTRACT

A colored original to be reproduced is scanned point-by-point in each of the three primary colors. The resulting imaging signals are processed to generate a luminance signal and a pair of chrominance signals. The luminance signal is branched into a high-pass filter channel and a low-pass filter channel. The high-pass portion of the luminance signal is amplified in accordance with a sublinear characteristic function which causes signals of small amplitude to be amplified to a greater degree than signals of large amplitude. The low-pass portion of the luminance signal is modified per a non-linear characteristic gradation function. The thus-modified high-pass and low-pass portions of the luminance signal are added to yield an enhanced luminance signal. The enhanced luminance signal is divided by the original luminance signal and each of the chrominance signals is multiplied by the resulting quotient. This automatially compensates for the changes in color saturation which accompany changes in brightness. After the multiplication, the chrominance signals are amplified in accordance with a sublinear characteristic function which causes signals of small amplitude to be amplified to a greater degree than signals of large amplitude. This characteristic function further has a form such that no additional ampification takes place beyond a predetermined threshold limit.

17 Claims, 6 Drawing Sheets

METHOD OF ELECTRONICALLY IMPROVING THE SHARPNESS AND CONTRAST OF A COLORED IMAGE FOR COPYING

BACKGROUND OF THE INVENTION

The invention relates generally to a method of copying a colored original.

More particularly, the invention relates to a method of electronically enhancing the image of a colored original.

In a known method of electronically processing the image of an original, the original is electrooptically scanned along rows and columns in each of the three primary colors red, green and blue. The resulting imaging signals are converted into a luminance signal and two chrominance signals representing differences between colors. The luminance signal is processed for contrast enhancement by dividing such signal into two portions one of which is sent through a high-pass channel and the other of which is sent through a low-pass channel having different amplifying characteristics than the high-pass channel. The two portions of the luminance signal are added after passing through the respective channels to thereby yield an enhanced luminance signal.

The transformation of imaging signals into luminance and chrominance signals is used principally in the video art. The primary purpose is to carry out color corrections electronically when color distortion, e.g., a color cast, is present in the motif of the original or when color distortions requiring correction arise during transmission. Electronic image processing is frequently used to optimally adjust the color saturation and the color contrasts of an image to the characteristics of the photographic copy material or to accentuate the color saturation and the color contrasts of the original. The principles of electronic color correction are described, for example, in the following texts: (i) H. Lang, Farbmetrik und Farbfernsehen, pp. 326-334 and 431 ff., R. Oldenbourg Publishing House, Munich, Vienna (1978); and (ii) W. K. Pratt, Digital Image Processing, pp. 50-90 and 155-161, John Wiley & Sons, New York/Chichester/Brisbane/Toronto (1978).

In electronic image processing, contrast treatment of the luminance signal is performed in order to adjust the gradation of the entire transmission system to the photographic copy material (global contrast treatment) and to accentuate the contrast in specific regions of the original (local contrast treatment). This allows an increase in the sharpness of the image to be obtained. The principles of these procedures are described in detail in the following texts: (i) F. M. Wahl, Digitale Bildverarbeitung, Springer Publishing House, Berlin, Heidelberg, New York, Tokyo (1984); and (ii) W. K. Pratt, Digital Image Processing (see above).

Electronic color processing using color correction circuits is being increasingly employed in the reproduction of colored originals (positive-positive) and the production of colored photographic positive images from colored negatives. See, for instance, the European patent application Nos. 70 680; 131 430; and 168 818. The original is here scanned along rows and columns and the resulting imaging signals are modified in accordance with specific criteria. The imaging signals obtained from an original are generally digitized and can then be stored in a digital memory. As a rule, scanning of the original is performed serially in the three primary colors red, green and blue (the primary colors red, green and blue will hereafter also be denoted by the letters R,G and B, respectively).

Experience has shown that the following parameters of an image must be adjustable in order to produce an optimum positive image:

(a) Color balance.
(b) Color saturation.
(c) Contrast (Gradation).

Frequently, these parameters cannot be adjusted independently of one another. Thus, when the gradation is changed, the color saturation, for example, may also be shifted. For this reason, the video art converts the RGB imaging signals into a luminance or brightness signal and two chrominance signals containing only the color information. However, it has been found that the contrast treatment in the luminance channel can influence the color saturation in the chrominance channels. Such shifting of the color saturation cannot be tolerated when strict requirements are imposed on image quality. In particular, it has been observed that an increase in brightness (greater amplification of the luminance signal) is accompanied by a desaturation of the image while the image appears to be more highly saturated when the brightness is decreased.

It has further been found that adjustment of the color saturation becomes critical when an original contains weakly saturated regions and more strongly saturated regions next to one another. Thus, the modulation rang of the chrominance channels has a limit which should not be exceeded in practice. Nevertheless, it may happen that this limit is reached or exceeded when the color saturation in one or both channels is increased. This over modulation leads to an undesired change in the nature of the colors, that is, to color falsifications.

OBJECTS AND SUMMARY OF THE INVENTION

It is an object of the invention to provide a method of copying a colored original which allows a quality image to be obtained.

Another object of the invention is to provide a method of copying a colored original which enables a sharp image having good contrast and saturation to be obtained.

An additional object of the invention is to provide a method of electronically processing the image of a colored original so that the sharpness of the image is increased by accentuation of high-frequency localized structures while, at the same time, highly satisfactory color reproduction is achieved.

A further object of the invention is to provide an arrangement designed to electronically process the image of a colored original and having a luminance channel capable of increasing image sharpness by accentuating high-frequency localized structures, and chrominance channels capable of simultaneously enhancing color reproduction.

It is also an object of the invention to provide a method of copying a colored original which makes it possible to produce an image having high resolution.

Yet another object of the invention is to provide a method of copying a colored original which is capable of yielding an image having not only high resolution and contrast but also a proper color balance.

A concomitant object of the invention is to provide a method of copying a colored original which makes it possible to produce an image of such quality that an observer will, even subjectively, regard the image as being properly colored and as representing a true reproduction of the objects constituting the motif of the original.

The preceding objects, as well as others which will become apparent as the description proceeds, are achieved by the invention.

One aspect of the invention resides in a method of producing an image of a colored original. The method involves electronic processing of the image and includes the steps of scanning the original in each of the primary colors, and generating imaging signals for each primary color based on the scanning step. An unprocessed luminance signal and a pair of unprocessed chrominance or color difference signals are formed from the imaging signals. The luminance signal is processed to improve the sharpness of the image, and the processing step includes: (i) dividing the luminance signal into a higher-frequency portion and a lower-frequency portion; (ii) modifying the lower-frequency portion based on a non-linear function, preferably a characteristic gradation function; (iii) amplifying the higher-frequency portion; and (iv) combining, e.g., adding, the modified lower-frequency portion and amplified higher-frequency portion to produce an enhanced luminance signal. Amplification of the higher-frequency portion is performed using a greater amplification factor when the magnitude of the higher-frequency portion is less than a first predetermined magnitude (small magnitudes of the higher-frequency portion correspond to low contrast in the image) and a smaller amplification factor when the magnitude of the higher-frequency portion exceeds the first predetermined magnitude (larger magnitudes of the higher-frequency portion correspond to high contrast in the image). It is preferred for amplification of the higher-frequency portion to be carried out on the basis of a sublinear characteristic transfer function. The method further comprises the step of processing at least one, and advantageously both, of the chrominance signals, and such processing includes multiplying the chrominance signal or signals by a ratio derived from the unprocessed and enhanced luminance signals, e.g., the ratio of the enhanced luminance signal to the unprocessed luminance signal. This multiplication makes it possible to automatically compensate for the increase in color saturation accompanying a decrease in brightness as well as the reduction in color saturation accompanying an increase in brightness. The step of processing the chrominance signals additionally includes amplifying the chrominance signals using a greater amplification factor when the magnitudes of the chrominance signals are less than a second predetermined magnitude (smaller magnitudes of the chrominance signals correspond to lower degrees of saturation) and a smaller amplification factor when the magnitudes of the chrominance signals exceed the second predetermined magnitude (greater magnitudes of the chrominance signals correspond to higher degrees of saturation). The amplification of the chrominance signals is preferably performed on the basis of a non-linear characteristic function. The step of processing the chrominance signals also includes maintaining the magnitudes of such signals within a predetermined modulation limit.

The scanning step may be performed point-by-point. This may be accomplished by scanning the original at different points along rows and columns.

The invention allows a number of advantages to be achieved. To begin with, the amplitude-dependent amplification in the high-pass channel during the treatment of contrast, that is, the amplitude-dependent amplification of the high-frequency portion of the luminance signal, causes small contrast differences in the image to be accentuated relatively strongly whereas large contrast differences are accentuated less strongly. This enables excessive accentuation of contrasts, which in practice frequently impart a "straw-like" impression to the image, to be avoided.

Moreover, adjustment of the color saturation in the chrominance channels occurs automatically in dependence upon a luminance signal which has been modified by contrast treatment. By virtue of this automatic adjustment of the color saturation, the weighted color impression of the image remains intact despite the contrast treatment.

Furthermore, due to the sublinear or non-linear amplification of the chrominance signals and the limitation of the modulation range in the chrominance channels, it becomes possible to virtually avoid a crossing of the boundary of the representable color space during external adjustment or accentuation of the color saturation. Accordingly, excess modulation effects leading to color falsifications may be minimized.

These advantages have a type of reciprocal synergistic effect which give an observer the impression of optimal image quality. The objects of the invention are thus achieved by a combination of the color and contrast treatments outlined above.

The novel features which are considered as characteristic of the invention are set forth in particular in the appended claims. The improved copying method itself, however, as well as the construction and mode of operation of an arrangement for carrying out the method, together with additional features and advantages of the method, will be best understood upon perusal of the following detailed description of certain specific embodiments with reference to the accompanying drawings.

DESCRIPTION OF THE PREFERRED EMBODIMENTS

Figure 1:
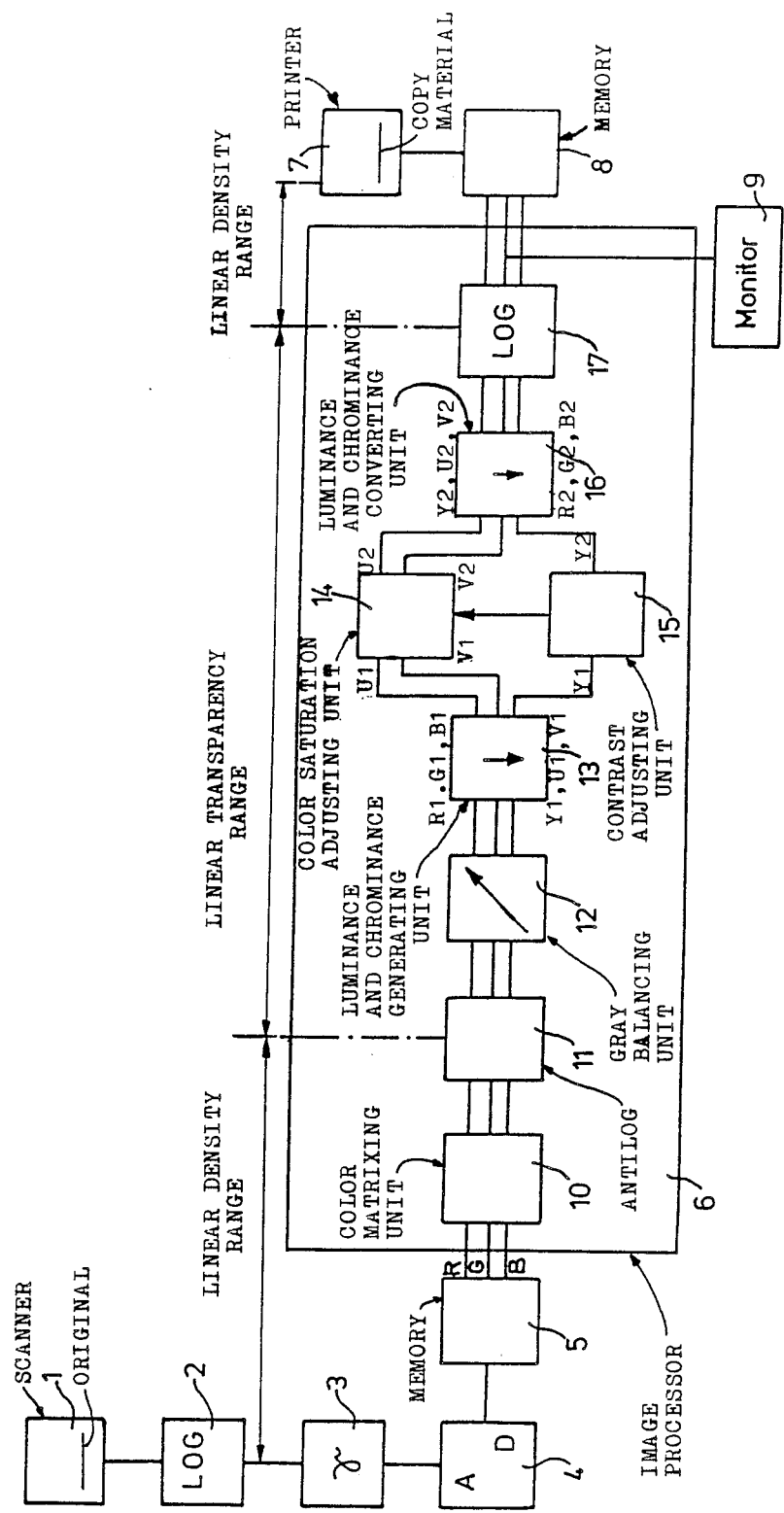
FIG. 1 is a schematic block diagram of a color reproduction system which may be used to carry out the method according to the invention.

Referring to FIG. 1, the reference numeral 1 identifies a scanner designed to electrooptically scan an original along rows and columns. The scanner 1 measures the transparencies of each of a multiplicity of points of the original in each of the three primary colors red, green, blue and generates electrical analog imaging signals for each point. The scanner 1 is in the form of a linear CCD (charge-coupled device) sensor which is oriented horizontally and is moved across the surface of the original at constant speed in a vertical direction. Scanning of the original is performed serially for the three primary colors. To this end, appropriate color filters are pivoted into the optical path between the CCD sensor and the original. The original is scanned at 2048 points per row and along 1024 columns so that an image of the original has associated with it 2048×1024 image elements (pixels) in each of the three primary colors. A conventional, non-illustrated correcting circuit eliminates errors arising from the CCD sensor, e.g., dark currents and different sensitivities of the CCD elements. The logarithms of the corrected analog imaging signals are then taken in a logarithmic unit 2. This causes the linear transparency imaging signals generated by the scanner 1 to be converted to linear density imaging signals. The operation of taking logarithms is performed while the signals are still in analog form because less calculation is required than when the signals have been digitized. The linear density imaging signals are transmitted to a unit 3 for gamma correction. The unit 3 corrects the behavior of the characteristic line of the original, e.g., gamma for a film negative may be 0.5 while gamma for a film positive may be 1.6.

The gamma correction takes place after logarithms are taken since the calculation of $Y=X^\gamma$ may then be performed using multiplication (amplification). Furthermore, the gamma correction is carried out prior to digitization so that the imaging signals are gamma-corrected at the time that the signals are digitized.

The unit 3 may also be used for signal inversion when the original is constituted by a film negative. In addition, it is possible to switch to different gamma values. The gamma-corrected analog imaging signals are digitized by an 8-bit analog-digital converter 4. The digitized imaging signals are then fed into a memory 5 where the three color components of the RGB image are stored separately. From the memory 5, the imaging signals are transferred to an image processor 6 where the actual electronic processing of the imaging signals takes place. The processed imaging signals are fed into a second memory 8 and, from the latter, into an image generating unit or printer 7 which is here in the form of a CRT (cathode ray tube) printer. The printer 7 converts the electrical imaging signals into an optical image which is then printed on photographic copy material, e.g., color positive paper. It is important to note that the printer 7 converts the electrical imaging signals in such a manner that the optical image is produced point-by-point, i.e., the printer 7 constitutes an image point serial printer. This allows each pixel to undergo image processing and to be subsequently printed on the copy material at a coordinate corresponding to the coordinate of the pixel on the original.

As already mentioned, the actual image processing takes place in the image processor 6. The image processor 6 may be externally regulated via a conventional, non-illustrated keyboard.

The memories 5 and 8 make it possible for the printer 7 to accept and print an image while, simultaneously, a new image is introduced into the memory 5 and processed by the image processor 6. The three basic procedures performed by the color reproduction system, namely, scanning by the scanner 1; image processing by the image processor 6; and image printing by the printer 7 can thus be separated from one another.

The image which is stored in the memory 8 and is about to be printed can be observed on a low resolution TV or video monitor 9.

An important facet of the present invention resides in special electronic measures for image adjustment and image improvement with the controlling criterion for the latter being the evaluation obtained upon visual observation. In particular, the image processor 6 has the following purposes and functions:

(a) Adjustment of the gray balance.

(b) Adjustment of the color saturation in steps.

(c) Adjustment of the gradation based on the image.

(d) Improvement of image sharpness.

The operation of the image processor will now be described in detail with reference still to FIG. 1. Special emphasis is placed upon automatic correction of the color saturation to that appropriate for the image taking into account overmodulation effects leading to color falsification and the interaction of such effects with global and local contrast treatments performed simultaneously in order to improve image sharpness.

As shown in FIG. 1, the image processor 6 includes a series of processing units 10,11,12,13, 14,15,16,17. The imaging signals stored in the memory 5 are first introduced into a color matrixing unit 10. The purpose of the color matrixing unit 10 is to compensate for color errors of the original (false density), the scanner 1 and the RGB filters caused by the reproduction system so that colors (as represented in the RGB unit color space) as close as possible to those of the objects constituting the motif of the original are obtained. FIG. 1 shows that the color reproduction system has a linear transparency range which is flanked on either side by a linear density range and that the color matrixing unit 10 is located in the left-hand linear density range. For precise correction, a second color matrixing unit should be provided in the linear transparency range. However, since the false density correction of the original predominates (especially for film negatives), a color matrixing unit is provided only in the linear density range to keep the electronics expense as low as possible. The color matrixing unit 10 may be in the form of a programmed invariable memory (PROM) containing a corrected imaging signal a'(x,y) for each initial imaging signal a(x,y). Inasmuch as such a memory is programmed in a manner resembling a table, it may be referred to as a Look-Up-Table (LUT). The color matrixing operation can take place only downstream of the memory 5 because this is the first time that the imaging signals for the three color components RGB appear in parallel. After passing through the color matrixing unit 10, the antilogarithms of the linear density imaging signals are taken by an antilogarithmic unit 11 consisting of three Look-Up-Tables which are respectively located in the RGB channels. Thus, downstream of the antilogarithmic unit 11, linear transparency imaging signals correctly representing the colors of the objects constituting the motif of the original are available for further processing. The Look-Up-Tables of the antilogarithmic unit 11 may be in the form of invariable memories (PROMs).

Upon leaving the antilogarithmic unit 11, the imaging signals enter a gray balancing unit 12. The gray balancing unit 12 can compensate for color deviations, e.g., color casts, which are not due to the reproduction system and cannot be corrected in the scanner portion or can produce a predetermined deviation, e.g., "warm" or "cold" white, from the standard gray point (achromatic point). The unit 12 for adjusting the gray value or balance is located upstream of the processing units for adjusting the contrast, sharpness and color saturation of the image so that modification of the color saturation can be based on the corrected or desired gray value or point. In addition, gray balancing is performed with the RGB imaging signals in order that the subsequent transformation to luminance and chrominance signals may be carried out on the basis of RGB imaging signals which have already undergone the gray correction. The gray balancing unit 12 may be constituted by three Look-Up-Tables (static RAMs) which can be loaded via a master computer and are respectively disposed in the RGB channels.

The RGB imaging signals issuing from the gray balancing unit 12 travel to a luminance and chrominance generating unit 13 which transforms the RGB imaging signals into a brightness signal Y (luminance signal) which is independent of color and two color difference signals U,V (chrominance signals) which are independent of brightness. The transformation takes place in a known manner according to the following equations:

$$Y1 = 0.3R1 + 0.6G1 + 0.1B1 \quad (1)$$

$$U1 = B1 - Y1 \quad (2)$$

$$V1 = R1 - Y1 \quad (3)$$

This transformation requires linear transparency signals.

The chrominance signals U1, V1 are sent to a color saturation adjusting unit 14 while the luminance signal Y1 is sent to a contrast adjusting unit 15. In the color saturation unit 14, the color saturation is corrected automatically in dependence upon the adjusted luminance signal Y2 which is generated by the contrast adjusting unit 15. It is possible to preselect the color saturation independently by means of a keyboard which allows the color saturation to be varied in steps. The contrast adjusting unit 15 which receives the luminance signal Y1 modifies or adjusts the gradation (global contrast treatment) and separately accentuates higher localized frequencies (local contrast treatment). The modified luminance signals Y2 and modified chrominance signals U2,V2 are forwarded to a luminance and chrominance converting unit 16 where they are transformed back into RGB signals R2,G2,B2 using the inverses of Equations (1)–(3). The signals R2,G2,B2 issuing from the luminance and chrominance converting unit 16 are in the form of linear transparency imaging signals, and these signals enter a second logarithmic unit 17 which takes the logarithms of the imaging signals R2,G2,B2 to thereby yield linear density imaging signals. The linear density imaging signals obtained in this manner are loaded into the memory 8.

The RGB to YUV transformation is taken from the video art and has been found to give good results when used for the electronic processing of images in systems for the reproduction of a colored original on copy material. However, there are other transformations which produce a pure brightness signal Y and two chrominance signals U and V containing the color information. These include the IHS transformation and the Lab transformation. For details of the above transformations, reference may be had to the literature of the art. See, for example, W. K. Pratt, Digital Image Processing, pp. 84–87, John Wiley & Sons, New York/Chichester/Brisbane/Toronto (1978). In the following description, the RGB to YUV transformation will always be assumed for the sake of simplicity.

Circuitry capable of effecting correction of the color saturation in dependence upon the luminance signal as modified by the contrast adjusting unit 15 will now be described in conjunction with exemplary embodiments.

In principle, the contrast adjusting unit 15 is a two-dimensional digital filter which accentuates or suppresses specific localized frequency regions in the image. It is based on the known filter principle according to which the imaging signals f(x,y) travel through a low-pass filter to yield low-pass signals m(x,y) which are subtracted from the original imaging signals f(x,y) in a differential amplifier to form high-pass signals f-m. The high-pass signals f-m are linearly amplified and then added to the low-pass signals m(x,y) in a summing circuit. The resulting output signal is here denoted g(x,y). The corresponding filter equation is as follows:

$$g(x,y) = m(x,y) + K \cdot [f(x,y) - m(x,y)] \quad (4)$$

For digital signals, the low-pass filter is a matrix filter. This matrix filter is realized in that, for each pixel, an average of the imaging signals for its immediate surroundings is formed. This represents a window in the local area within which the original yields a scanning value by averaging. The averaging may, for example, be performed over 3×3, 5×5 or 7×7 image elements. An average value is assigned to each image element, that is, the window is electronically shifted through the local area.

The amplification factor K of the linear amplifier allows the amplification of the frequencies corresponding to the fine structures of the image to be adjusted steplessly. This results overall in an increase in contrast of the fine (high-frequency) structures of the image. However, when the high-frequency structures of the image are subjected to a large increase in contrast, the image gives a "straw-like" impression since structures having relatively great contrast are accentuated excessively.

The conventional filter principle has the further disadvantage that stochastic disturbance signals, i.e., optical, arising from the granularity of the original or from electronic noise caused by the reproduction system are treated in the same manner as the imaging signals.

In conventional electronic image processing, all of the imaging signals for a image are evaluated by means of a characteristic gradation line in order to achieve optimum adjustment of the contrast to the gradation of the photographic copy material being used. This characteristic line may, for example, have an S-like configuration. The associated circuit is normally disposed before and after the filter circuit. Consequently, as regards the gradation, the high-frequency detailed structures (microstructures) are treated in precisely the same manner as the low-frequency coarse structures which are of importance primarily in establishing the overall contrast (global contrast). This effect is particularly marked in the flat regions of the characteristic gradation line when the contrast treatment follows the filtering operation. It may be observed that the high-frequency microstructures, which undergo an increase in contrast in the filter, are then subsequently damped thereby resulting in a partial loss of the filtering effect. This gives rise to the requirement that separate signal processing paths must be provided for the imaging signals which determine the microcontrasts and those which determine global contrast.

Figure 2:
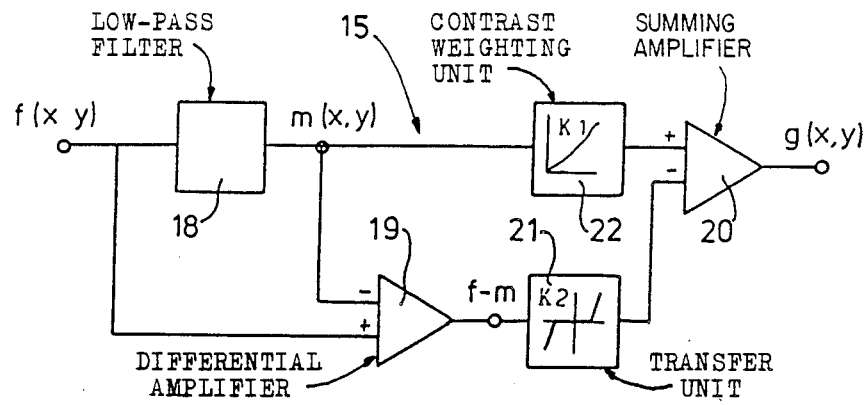
FIG. 2 is a circuit diagram of a contrast adjusting unit which forms part of the system of FIG. 1 and is designed to perform an aperture correction in accordance with the invention.

In view of these considerations, the improved filter structure of FIG. 2 was developed from the known filter principle outlined above. This filter structure is particularly well-suited for digitized one-dimensional and two-dimensional imaging signals (corresponding to the x and y coordinates of the original). Nevertheless, the same filter principle may be used for analog signals.

The filter circuit of FIG. 2 includes a low-pass channel having a low-pass filter 18 and a high-pass channel provided with a differential amplifier 19. The differential amplifier 19 functions to subtract the low-pass signals m(x,y) issuing from the low-pass filter 18 from the original imaging signals f(x,y). The filter circuit of FIG. 2 further includes a summing amplifier 20 in which the high-pass signals are added to the low-pass signals after amplification of the high-pass signals.

An important distinction between the known filter principle and that of FIG. 2 resides in that the high-pass signals f-m of FIG. 2 are evaluated by means of a non-linear or sublinear characteristic line or function to be described in more detail below and, independently, the low-pass signals m(x,y) are subjected to a contrast treatment. To this end, a transmission or transfer unit 21 having non-linear characteristics is disposed in the high-pass channel while a contrast weighting or evaluating unit 22 with a characteristic line or function which may, for instance, be S-shaped, is disposed in the low-pass channel. The filter equation is accordingly as follows:

$$g(x,y) = K1 \cdot [m(x,y)] + K2 \cdot [f(x,y) - m(x,y)] \quad (5)$$

Here:
g(x,y) is the filter output signal,
f(x,y) is the filter input signal,
m(x,y) is the low-pass signal,
f(x,y)-m(x,y) is the high-pass signal,
K1 is a factor representing the characteristic function for evaluating the low-pass signal, and
K2 is a factor representing the characteristic function for evaluating the high-pass signal.

Figure 3:
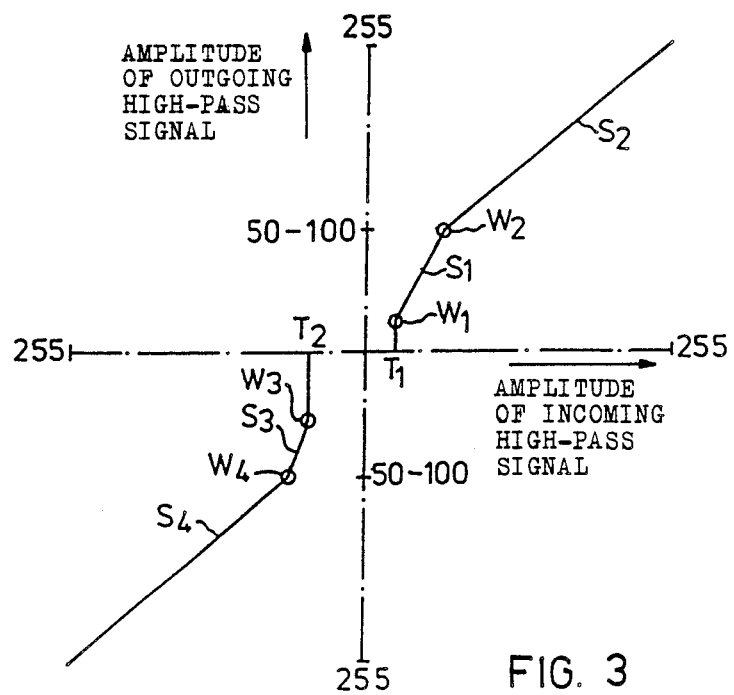
FIG. 3 illustrates a sublinear characteristic amplification function for a high-pass channel constituting part of the contrast adjusting unit of FIG. 2.

The non-linear characteristic transfer function K2 of the transfer unit 21 located in the high-pass channel of FIG. 2 has a special form, and the characteristics of this function will be described with reference to FIG. 3. Since the high-pass signal can be regarded as a high-frequency modulation of the low-pass signal and the low-pass signal corresponds to an average brightness of the image, the origin of the characteristic function K2 is located at the average image brightness associated with the particular low-pass signal. Grossly simplified, negative signal amplitudes in this illustration correspond to dark portions of the image and positive signal amplitudes to light portions. The transfer behavior of this non-linear characteristic function is essentially such that signals having small amplitudes or magnitudes are amplified to a greater degree than signals having large amplitudes or magnitudes. Signals having small amplitudes represent small modulations, and hence low contrast in the image, whereas signals having large amplitudes represent large modulations and high contrast. The criteria relating to the transfer behavior of the non-linear characteristic function K2 apply to dark as well as light regions of the image. In FIG. 3, these criteria are represented as follows:

Slope S1 greater than slope S2; and
Slope S3 greater than Slope S4

Furthermore, the characteristic function K2 does not begin at the origin but, rather, at a threshold value T1 for positive signal amplitudes and a threshold value T2 for negative signal amplitudes. This allows the previously-mentioned noise signals, whether optical or electrical, to be suppressed. The threshold value T1 is here approximately equal to 3% of full modulation. Full modulation in the illustrated embodiment corresponds to a value of 255 which is the largest value that can be represented with 8 bits.

In order to take account of the fact that, at the same degree of modulation, the eye will sense a light-dark contrast differently than a corresponding dark-light contrast, the parameters of the characteristic function K2 in the region of negative signal amplitudes (third quadrant) differ from those in the region of positive signal amplitudes (first quadrant).

The amplification of the high-pass signals, which is controlling for the contrast evaluation of the microstructures, is then unsymmetrical for positive and negative signal amplitudes as considered with reference to the average brightness (origin). The asymmetry arises because, on the one hand, the threshold value T2 for noise suppression at negative amplitudes is greater than the threshold value T1 at positive amplitudes and, on the other hand, the slopes of the first inclined portions of the characteristic function are different in the positive and negative regions of signal amplitude. Thus, the slope S3 of the second segment of the characteristic function in the third quadrant (negative signal amplitudes) is greater than the slope S1 of the corresponding segment in the first quadrant (positive signal amplitudes). In contrast, at relatively great signal amplitudes, the slopes of the characteristic function in the positive and negative regions of signal amplitude are almost identical.

As illustrated in FIG. 3, the characteristic function in the region of positive signal amplitudes, as well as in the region of negative signal amplitudes, may be composed of three segments. The first segment in each case is constituted by a short vertical rise at the respective threshold value T1,T2. The first segment is followed by the second segment of slope S1 or S3 which, in turn, is followed by a third segment having the slope S2 or S4. The parameters of the characteristic function for positive and negative high-pass signal amplitudes may be summarized as follows:

S1 greater than S2; S3 greater than S1.
S3 greater than S4; S4 approximately equal to S2.

Magnitude of T1 less than magnitude of T2.
T1=5 to 10 as measured on the abscissa.
T2=10 to 20 as measured on the abscissa.
W1=5 to 10 as measured on the ordinate.
W2=50 to 100 as measured on the ordinate.
W3=10 to 20 as measured on the ordinate.
W4=50 to 100 as measured on the ordinate.

Instead of a characteristic function with discrete sloped segments, it is possible to use a curved continuous characteristic function having a slope which decreases steadily beginning at small amplitudes. The transfer unit 21 having the characteristic function K2 may be constituted by a two-dimensional Look-Up-Table. This has the advantage that the transfer unit 21 may be programmed with characteristic functions of any desired form and successive empirical adaptations may be carried out to arrive at an image of optimum quality. The means employed in the high-pass channel to increase contrast together with the global contrast evaluation which is performed independently in the low-pass channel on the basis of an approximately S-shaped characteristic function K1 make it possible to achieve a significant improvement in image quality when making a reproduction on photographic color copy material.

Figure 4:
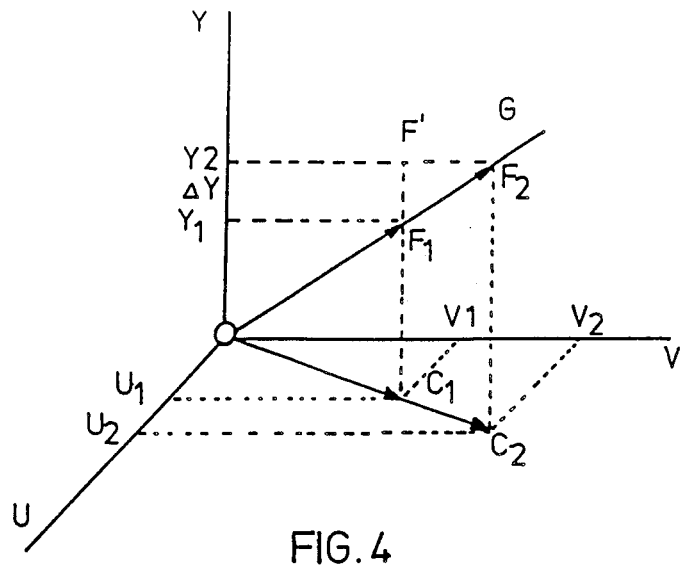
FIG. 4 shows color vectors in luminance-chrominance color space.

FIG. 4 illustrates a luminance-chrominance coordinate system in which a color space is defined by a luminance axis Y and a pair of chrominance axes U and V. A color vector F in this system has a component Y which represents brightness or light intensity and two chrominance components U,V containing only color information.

FIG. 4 shows a color vector F1 in the luminance-chrominance color space, and the vector F1 has a luminance component Y1 and a pair of chrominance components U1,V1. The origin of the luminance-chrominance system (Y=O, U=O, V=O) corresponds to the achromatic point (gray point). All color valences for which the nature of the color is the same as that for the vector F1 but having a different light intensity (brightness) lie on the straight line G defined by the vector F1. If the chrominance vector C1, which is a resultant of the chrominance components U1, V1 of the vector F1, is extended by multiplication with a constant factor to yield a new chrominance vector C2, the color saturation is increased while the color tone remains the same. It follows that colors with a low degree of saturation lie near the origin as considered in the chrominance plane U,V whereas the more strongly saturated colors lie farther out. The more strongly saturated chrominance vector C2 corresponds to the vector F2 lying on the straight line G which represents the coloring of the vector F1. On the other hand, if the light intensity of the color vector F1 is increased from Y1 to Y2 while keeping the chrominance components U1,V1 unchanged, one arrives at the point F'. It is only when the increase in light intensity from Y1 to Y2 is accompanied by an increase in color saturation from C1 to C2 that the "correct" color vector F2 lying on the straight line G is obtained.

In practice, this means that an increase in light intensity (brightness) in specific areas of the image is accompanied by a desaturation of these areas whereas a decrease in brightness is accompanied by an increase in saturation. Thus, in the absence of special precautions, the color saturation is falsified when carrying out a contrast treatment as in the luminance circuit of FIG. 2.

This problem is overcome by a circuit which functions to correct the color saturation and is designed so that an increase in the luminance signal from Y1 to Y2 in FIG. 4 does not lead to the point F' but, rather, to the end point of the color vector F2. Applying the theorem of similar triangles to the triangle defined by the vectors F1,C1 and the triangle defined by the vectors F2, C2, the following result is obtained:

$$\frac{F1}{F2} = \frac{Y1}{Y2} = \frac{C1}{C2} = \frac{U1}{U2} = \frac{V1}{V2} \qquad (6)$$

From this it follows that:

$$U2 = U1 \cdot \frac{Y2}{Y1} \quad V2 = V1 \cdot \frac{Y2}{Y1} \qquad (7)$$

A proper saturation correction with respect to color is thus achieved when both chrominance components U1,V1 are multiplied by the same factor Y2/Y1. By means of this operation, the weighted color impression (color type and color saturation) remains unchanged even when the light intensity in specific areas of the image is varied in a specified manner during a contrast treatment in the contrast adjusting unit 15. In other words, the increase in color saturation accompanying a decrease in brightness, as well as the decrease in color saturation accompanying an increase in brightness, are automatically compensated for.

Frequently, an S-shaped characteristic gradation function is used for global contrast evaluation of an original (characteristic function K1 in the contrast adjusting unit 15 of FIG. 2). Due to the S-like configuration of the characteristic gradation function, the brightness is reduced at small values and increased at large values. In addition, an increase in contrast takes place in the central region (point of inflection). In the absence of the above-described correction of the color saturation, the relatively dark areas of the original would appear to be excessively saturated and the relatively light areas of the image would appear to be desaturated. This shifting of the color saturation is compensated for by the circuit of FIG. 5.

Figure 5:
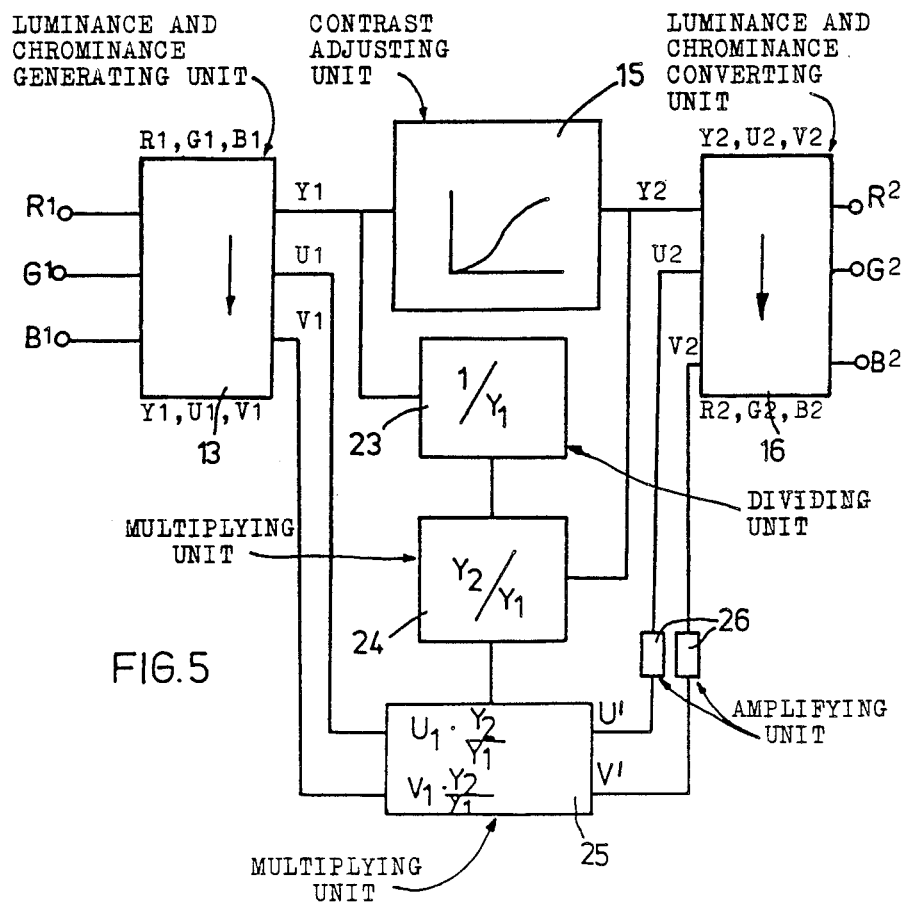
FIG. 5 is a block diagram showing certain features of a color saturation adjusting unit forming part of the system of FIG. 1 and designed to automatically regulate the color saturation in dependence upon image brightness.

The transformation of the RGB imaging signals to YUV signals in the luminance and chrominance generating unit 13, as well as the reverse transformation of the modified luminance and chrominance signals Y2,U2,V2 in the luminance and chrominance converting unit 16 following contrast treatment in the contrast adjusting unit 15 and color saturation correction in the color saturation adjusting unit 14, have already been briefly discussed in conjunction with FIG. 1. The contrast adjusting unit 15 modifies the luminance signal, e.g., per the characteristic gradation function described above. As shown in FIG. 5, a portion of the original luminance signal Y1 is branched off upstream of the contrast adjusting unit 15 and sent to a dividing unit 23 where the reciprocal of the original luminance signal, namely, 1/Y1, is formed. This reciprocal is then forwarded to a multiplying unit 24 where it is multiplied by the modified luminance signal Y2 issuing from the contrast adjusting unit 15. The output signal Y2/Y1 of the multiplying unit 24 is introduced into a second multiplying unit 25 which multiplies each of the original chrominance signals U1,V1 with the output signal Y2/Y1 of the multiplying unit 24. The thus-modified chrominance signals U',V' are fed to Look-Up-Tables 26 to be described later. The chrominance signals U2,V2 issuing from the Look-Up-Tables 26 are converted back to the RGB signals R2,G2,B2 in the luminance and chrominance converting unit 16.

The dividing unit 23; multiplying units 24,25; and Look-Up-Tables 26 all constitute part of the color saturation adjusting unit 14.

As already explained with reference to FIG. 4, a desired increase in saturation may be achieved by multiplying the chrominance components U1,V1 of a color vector F1 with a predetermined amplification factor k. The amplification factor k may be preselected and optimally adjusted either continuously, e.g., via a potentiometer, or in steps, e.g., by means of a keyboard. In practice, the color channels R,G,B (see FIG. 1) have a limited modulation range. As long as the saturation increase in the two chrominance channels remains within this modulation range, no problems arise. However, when the modulation range is exceeded, non-linear overmodulation effects can occur. This will be described with reference to FIG. 6.

Figure 6:
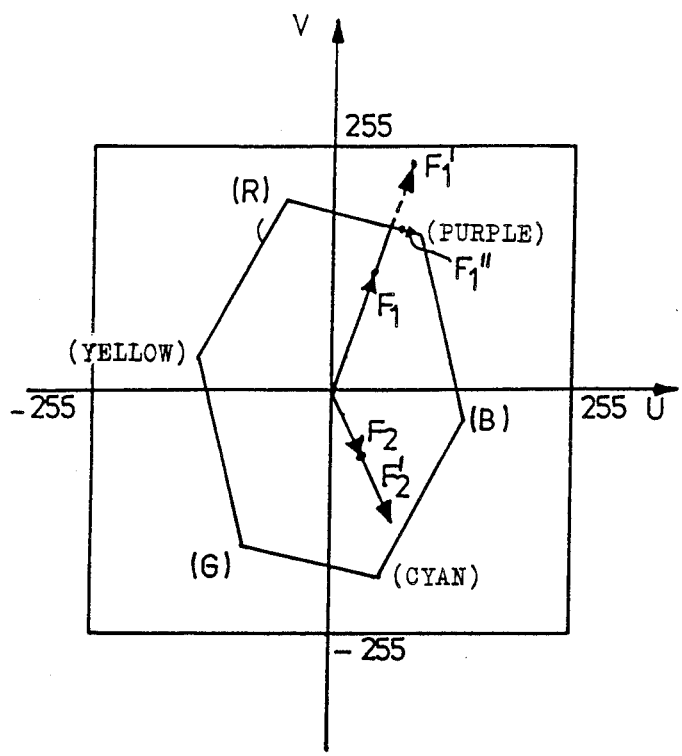
FIG. 6 is a projection of RGB color space in the chrominance plane showing the boundary of the color space as determined by system parameters and illustrating the consequences of overmodulation.

In FIG. 6, the values +255 and −255, which are set based on a transmission width of 8 bits (the ninth bit is reserved for the sign), represent the limits of the channels for the chrominance channels. These limits define a square and inside this square is a symmetrical hexagon representing the color space which can be transmitted through the R,G,B channels. The vertices of the hexagon correspond to the beams of color red, yellow, green, cyan, blue and purple known from the video art. For details, see page 333 of the previously-referenced book by H. Lang entitled "Farbmetrik und Farbfernsehen". The available range of values for the chrominance vectors in RGB space corresponds to the area covered by the hexagon. The color vectors F1 and F2 are both located within the hexagon. If now the color saturation is increased, e.g., by a factor of 2, the lengths of the color vectors F1 and F2 are doubled and the longer vector F1 extends beyond the modulation limit defined by the hexagon as indicated at F1' while the shorter vector F2 remains within the hexagon as indicated at F2'. Since the vector F1' cannot exist, the penetration of the modulation limit which occurs upon amplification of the color vector F1 causes this vector to move along the periphery of the hexagon defining the modulation limit in a direction towards the purple vertex of the hexagon. This effect, which is shown by the vector F1'', leads to an undesired change in the nature of the color, that is, to color falsifications. Thus, when the increase in saturation is too great, the color vector shifts toward one of the primary colors red, green, blue or one of the mixed colors yellow, cyan, purple.

Of particular concern here is the fact that color vectors which differ relatively little in color type but have a relatively high saturation will, upon further amplification to a degree such that overmodulation occurs, tend towards virtually the same point on the boundary defining the modulation limit. This causes the color contrasts which were originally present to disappear. Large "block-like" color structures are created because, in the extreme case, only six colors can still be achieved, that is, the range of color values is greatly reduced.

This problem is alleviated by a unit in each of the chrominance channels which reduces or limits the amplification when the color vector lies at or near the modulation limit.

Figure 7:
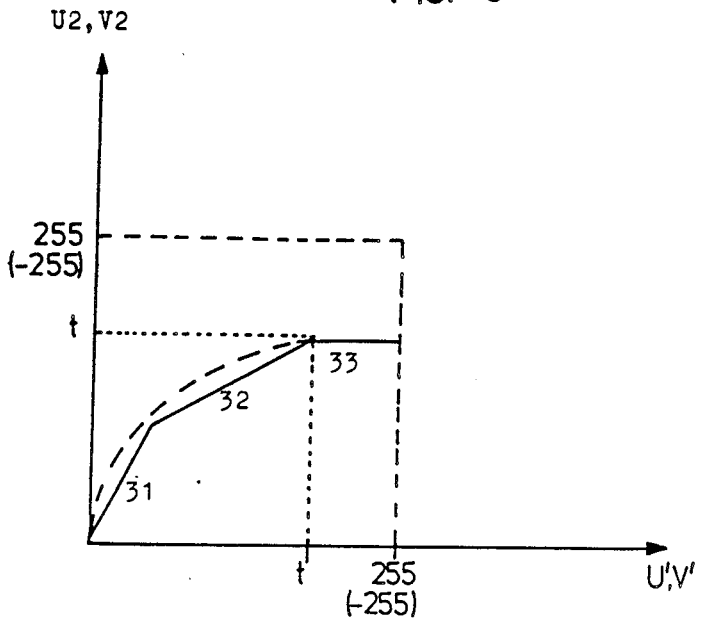
FIG. 7 illustrates characteristic amplification functions for chrominance signals.

These units, which are identified by the reference numeral 26 in FIG. 5 and are disposed in the chrominance channels between the multiplying unit 25 and the luminance and chrominance converting unit 16, are amplifying circuits each designed with a non-linear or sublinear characteristic line or function as shown in FIG. 7. The characteristic function has a slope which decreases with increasing amplitude or magnitude. The characteristic function may curve continuously as indicated by the dashed line or may be composed of a plurality of straight line segments 31 and 32 having different slopes. As illustrated at 33, the characteristic function becomes horizontal at a predetermined threshold value t. Thus, no further increase in saturation takes place here. The threshold value t is advantageously selected to be below the modulation limit (FIG. 6) so that, when the saturation is increased, as many chrominance values U,V as possible lie within the acceptable range of values. In general, the threshold value t will be between 150 and 200. When the characteristic function is made up of a plurality of straight line segments 31,32, the slope of the first segment may be approximately 1 to 3. The junction between the first and second segments 31,32 may lie in the range of 50 to 100, and the slope of the second segment 32 may be 0.3 to 1. A characteristic amplification function such as this causes signals of small magnitude in both chrominance channels to be amplified to a greater extent than signals of larger magnitude corresponding to a higher degree of saturation. Furthermore, a characteristic amplification function of this type has the effect that no additional amplification occurs once the threshold value t has been reached. It has been found empirically that, in this manner, the chrominance values U,V are restricted to the acceptable range of FIG. 6 for the majority of the imaging signals. As a rule, overmodulation is eliminated.

Moreover, this sublinear or non-linear amplification has the advantage that an adjustment to the physiological color contrast sensitivity of the eye takes place.

As indicated earlier in passing, the sublinear or non-linear characteristic function and associated modulation limit may be realized by designing the amplifying units 26 as Look-Up-Tables.

Figure 8:
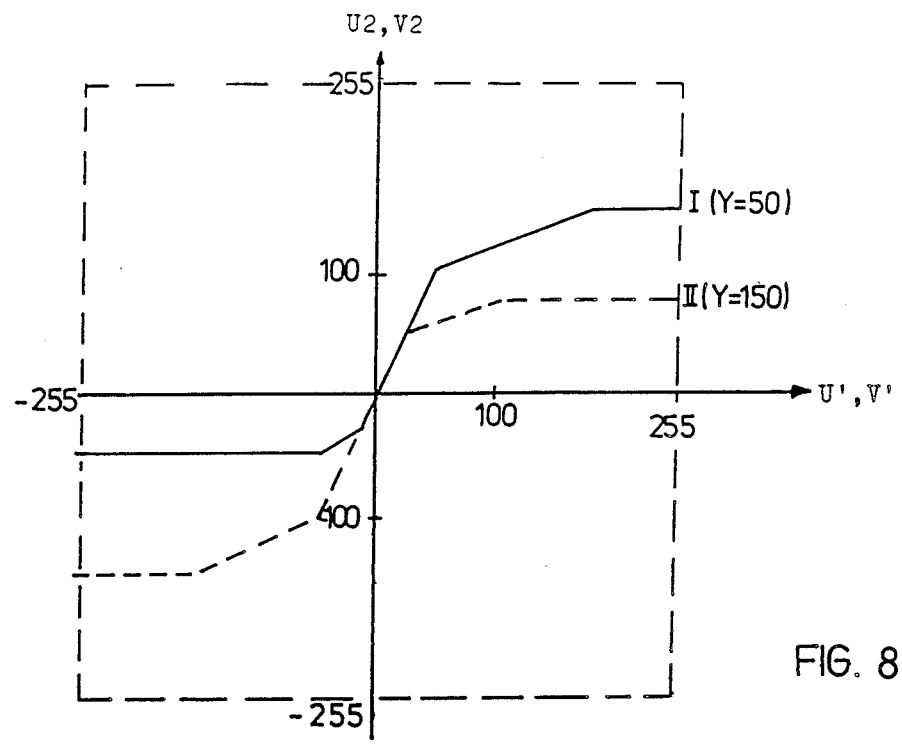
FIG. 8 is a block diagram of an optional part of the color saturation adjusting unit of FIG. 1 designed for dependence of the chrominance signals on a luminance signal when a sublinear characteristic transmission function is employed in the chrominance channels.
Figure 9:
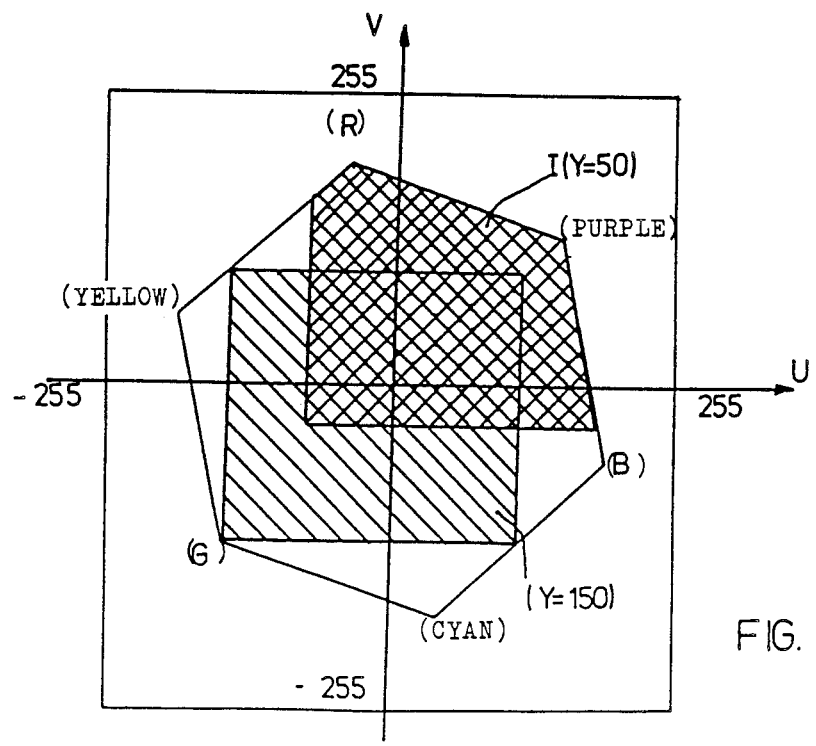
FIG. 9 illustrates a pair of characteristic functions for chrominance signals corresponding to two different luminance signals and controlling the transmission of chrominance signals processed in a color saturation adjusting unit according to FIG. 8.

At high amplification (large increase in color saturation), color falsifications in the direction of the nearest primary color or the nearest mixture of the primary colors can still occur with the preceding arrangement. Color falsifications of this type are particularly prone to occur when the characteristic function is composed of a plurality of straight line segments 31,32 (see FIG. 7) and chrominance signals U,V are processed using different segments. Another source of error resides in that the range of values for the chrominance signals U,V, and therefore the modulation limit, are dependent upon the particular luminance signal Y. Accordingly, a substantial improvement in image quality during electronic correction, i.e., during an increase in color saturation, can be achieved if the modulation limit is not held constant but is adjusted as a function of the luminance signal Y based on the transformation equations (2) and (3) for the chrominance signals. This is illustrated in FIGS. 8 and 9. From equations (1)–(3) for the RGB to YUV transformations, the following relationships are obtained for the range of values of U,V:

$$-Y \leq U \leq 255 - Y \tag{8}$$

$$-Y \leq V \leq 255 - Y \tag{9}$$

Due to these relationships between the chrominance signals U,V and the luminance signal Y, different characteristic functions with different modulation limits must be used for different brightness levels. This is shown in FIG. 8. Thus, for a luminance signal Y=50, for example, the characteristic function I is controlling for an increase in saturation whereas the characteristic function II is employed for a luminance signal Y=150. It will be observed that the characteristic function II becomes horizontal at a significantly lower threshold value than the characteristic function I so that further amplification when using the characteristic function II stops much sooner than with the characteristic function I.

FIG. 9 shows the hexagonal modulation limit of FIG. 6 with the respective ranges of values for U,V corresponding to the characteristic functions I and II drawn in. The range of values I (crosshatched) is that for Y=50 and the range of values II (section lines) is that for Y=150. It will be observed that the ranges I and II overlap.

Figure 10:
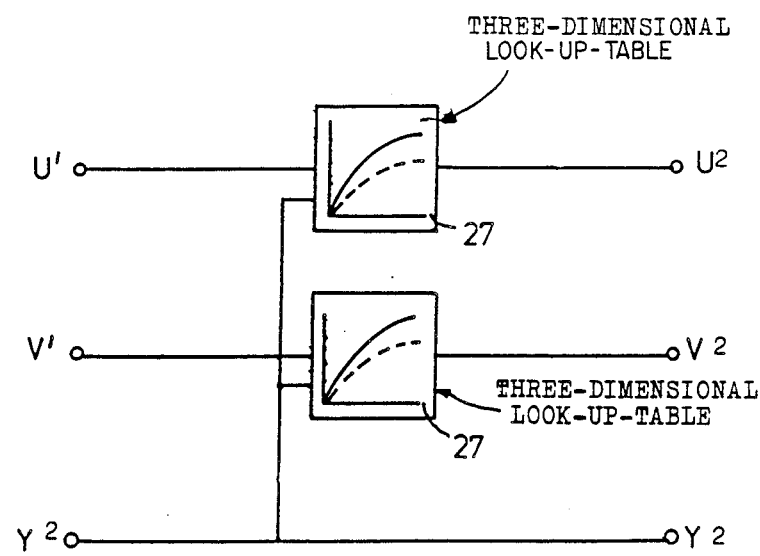
FIG. 10 shows ranges of values for the chrominance signals as established by the characteristic functions of FIG. 9.

The circuitry for establishing a dependence of the modulation limit on the luminance signal Y may include a pair of Look-Up-Tables 27 each of which is disposed in one of the chrominance channels. The Look-Up-Tables 27 are shown in FIG. 10. The Look-Up-Tables 27, which are three-dimensional, may be substituted for the amplifying units 26 of FIG. 5 which may be constituted by one-dimensional Look-Up-Tables. Thus, similarly to the amplifying units 26, the Look-Up-Tables 27 are located between the multiplying unit 25 and the luminance and chrominance converting unit 16. Each of the Look-Up-Tables 27 contains several characteristic functions which are associated with respective brightness levels. Whenever a change is made to another gray value, a new characteristic function is loaded into the Look-Up-Tables 27. To permit adjustment of the modulation limit in dependence upon the luminance signal Y, the contrast adjusting unit 15 is connected to the color saturation adjusting unit 14 via a conductor as shown in FIG. 1. Likewise, FIG. 10 shows a conductor branching from the luminance channel to both of the Look-Up-Tables 27.

In the circuits described above, the luminance signal employed for correction of the color saturation and establishment of the modulation limit is the output signal Y2 of the contrast adjusting unit 15 which corresponds to the imaging signal g(x,y) obtained in FIG. 2 after local and global contrast evaluation. Instead of the output signal Y2 of the contrast adjusting unit 15, it is possible to use only that portion of the luminance signal which has undergone global contrast evaluation for correction of the color saturation and establishment of the modulation limit in dependence upon the luminance signal. In this case, the output signal of the contrast weighting unit 22 of FIG. 2 is used to correct the color saturation and establish the modulation limit. This has certain advantages since the local contrasts of the fine image structures make only a small contribution to the overall perception of the image as regards color contrast. The luminance signal Y1 required for contrast evaluation in the color saturation correction circuit of FIG. 5, however, always corresponds to the filter input signal f(x,y) of FIG. 2.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the instant contribution to the art and, therefore, such adaptations should and are intended to be comprehended within the meaning and range of equivalence of the appended claims.

What is claimed is:

1. A method of producing an image of a colored original, comprising the steps of scanning said original in each of the primary colors of red, green and blue; generating imaging signals for each primary color based on the scanning step; forming an unprocessed luminance signal and a pair of unprocessed chrominance signals from said imaging signals; processing said luminance signal to improve the sharpness of said image, the processing step including dividing said luminance signal into a higher-frequency portion and a lower-frequency portion, modifying said lower-frequency portion based on a non-linear function, amplifying said higher-frequency portion, and combining the modified lower-frequency portion and amplified higher-frequency portion to produce an enhanced luminance signal, said amplifying being performed using a greater amplification factor when the magnitude of said higher-frequency portion is less than a first predetermined magnitude and a smaller amplification factor when the magnitude of said higher-frequency portion exceeds said first predetermined magnitude; and processing at least one of said chrominance signals, including multiplying said at least one chrominance signal by a ratio obtained from said unprocessed and enhanced luminance signals, and amplifying said at least one multiplied chrominance signal, said amplifying of said at least one multiplied chrominance signal being performed using a greater amplification factor when the magnitude of said at least one multiplied chrominance signal is less than a second predetermined magnitude and a smaller amplification factor when the magnitude of said at least one multiplied chrominance signal exceeds said second predetermined magnitude, the step of processing said at least one chrominance signal further including maintaining the magnitude of said at least one amplified multiplied chrominance signal within a predetermined limit.

2. The method of claim 1, wherein the scanning step is performed point-by-point.

3. The method of claim 1, wherein said combining comprises adding said modified lower-frequency portion to said amplified higher-frequency portion.

4. The method of claim 1, wherein said amplifying of said higher-frequency portion is performed on the basis of a sublinear characteristic transfer function.

5. The method of claim 1, wherein said non-linear function is a characteristic gradation function.

6. The method of claim 1, wherein the step of processing said at least one chrominance signal is performed for both chrominance signals.

7. The method of claim 1, wherein said amplifying of said at least one chrominance signal is performed on the basis of a non-linear characteristic function.

8. The method of claim 1, wherein said ratio is obtained by dividing said enhanced luminance signal by said unprocessed luminance signal.

9. The method of claim 1, wherein said enhanced luminance signal is variable and said predetermined limit is a function of said enhanced luminance signal.

10. The method of claim 9, wherein the forming step is performed according to predetermined relationships between said imaging signals and said unprocessed luminance signal and pair of unprocessed chrominance signals, and said predetermined limit is derived from said enhanced luminance signal based on said predetermined relationships.

11. The method of claim 1, said imaging signals being analog signals; and further comprising the step of taking the logarithms of said imaging signals prior to the forming step.

12. The method of claim 11, further comprising the step of digitizing said imaging signals between the taking and forming steps.

13. The method of claim 12, further comprising the step of processing the digitized imaging signals prior to the forming step to improve said image.

14. The method of claim 12, further comprising the step of subjecting the digitized imaging signals to color matrixing prior to the forming step.

15. The method of claim 14, further comprising the step of storing the digitized imaging signals prior to the subjecting step.

16. The method of claim 14, further comprising the step of taking the antilogarithms of the digitized imaging signals between the subjecting and forming steps.

17. The method of claim 16, further comprising the step of adjusting the gray balance of the digitized imaging signals between the antilogarithm taking step and the forming step.

* * * * *